United States Patent [19]

Tottey

[11] Patent Number: 4,890,827
[45] Date of Patent: Jan. 2, 1990

[54] RODENT RACEWAY

[76] Inventor: Robert L. Tottey, P.O. Box 4843, Ithaca, N.Y. 14852

[21] Appl. No.: 149,708

[22] Filed: Jan. 29, 1988

[51] Int. Cl.⁴ ............................................. A63L 1/00
[52] U.S. Cl. ........................................ 272/4; 119/5
[58] Field of Search .................... 272/3, 4, 5; 119/5, 119/15.5; 273/86 R

[56] References Cited

U.S. PATENT DOCUMENTS

| | | | |
|---|---|---|---|
| 2,117,616 | 5/1938 | Levenstein | 272/4 |
| 2,330,899 | 10/1943 | Levenstein | 272/4 |
| 2,524,906 | 10/1950 | Groh . | |
| 2,631,041 | 3/1953 | Zaichick | 273/86 R |
| 2,635,877 | 4/1953 | Levenstein | 272/4 |
| 2,657,927 | 11/1953 | Pease | 272/4 |
| 3,899,167 | 8/1975 | Braunhut | 272/4 |

FOREIGN PATENT DOCUMENTS 749417 7/1933 France ................................. 272/4
658563 10/1951 United Kingdom ................. 272/4

Primary Examiner—Richard E. Chilcot, Jr.
Attorney, Agent, or Firm—Ralph R. Barnard

[57] ABSTRACT

Apparatus and method for transporting and racing small creatures, such as gerbils, without creating a health hazard at an eating establishment or subjecting the creatures to mishandling by patrons. The creatures are transported in individual starting boxes which are held within a larger storage box. When it is time to race, the starting boxes are placed in receptacles in a track board which is totally enclosed by a see-through front and which has several individual racing lanes. Tally boards are used to keep track of odds, results, track condition, post time, etc. Patrons use betting forms to place bets on the races. Correct picks net points for the better. Bettors with the highest points get prizes.

4 Claims, 2 Drawing Sheets

RODENT RACEWAY

BACKGROUND OF THE INVENTION

The present invention relates to the entertainment field and more particularily to the racing of small creatures for amusement and apparatus for handling the same.

Animal racing, such as horse racing, has long been recognized for entertainment and sport. Other smaller creatures have also been raced in various situations under less formal circumstances. While the present invention is equally applicable to all small creatures such as rodents, reptiles, and insects, it is used by way of example with gerbils in the preferred embodiment disclosed.

A health problem arises particularily when rodents or other creatures are being raced in a food establishment. All out-of-cage handling is considered a health hazard and is not acceptable to the Health Department. Additionally, such creatures are vulnerable to mishandling and ause by patrons when contact is allowed.

Thus, it is the primary object of the present invention to provide an escape-free apparatus and method for transporting and racing rodents or other small creatures, such that the creatures remain completely confined at all times.

It is another object of the present invention to provide entertainment by racing small creatures at no additional risk to the creatures themselves.

It is yet another object of the preent invention to provide increased entertainment by encouraging patron participation in the conduct of races for the purpose of winning prizes.

It is still another object of the preent invention to increase the patronage at establishments, such as bars and restaurants, on slow nights.

SUMMARY OF THE INVENTION

The present invention is a method and apparatus for racing small creatures, such as rodents, in food establishments without creating a health hazard as defined by Health Department regulations. The small creatures are transported to the operating location of the track in a "stable" box with one or more "stable" drawers (10) holding the seperately enclosed boxes for each small creature and such separate enclosed boxes are hereinafter known as a starting box. The stable box is used to transport all of the creatures at once and each small creature has its seperate enclosure; ie. a starting box. An enclosed track board with individual racing lanes is set up to receive the starting boxes via a receptical in each racing lane (11). The creatures are released into the racing lanes by means of a sliding gate in the starting box and are returned to their starting boxes by a chase paddle suspended inside of each racing lane. Tally boards are used to keep track of odds, results, track condition, post time, etc. Betting forms are provided so that patrons may win prizes based on the number of points they earn. At the end of all of the races, the creatures are returned to their starting boxes which are then removed and placed back in the storage box. Simultaneous opening of the plural starting gates is required. Prior art, patent No. 2,524,906 to Ambrose W. Groh, suggests one detailed approach to that problem. However, Groh does not attempt to solve many of the inherit problems in the conduct of racing an animal not guided by a jockey, including the need for isolation of animal because of health concerns and potential mishandling by partons at the location of the race.

DESCRIPTION OF THE PREFERRED EMBODIMENT

The teachings of the present invention are best understood by a step-by-step description of how the invention is used in practice. The reference numbers referred to in the description below are the same in each figure. While gerbils are the creatures used by the inventor for the races, the present invention is not limited to gerbils or rodents. However, they will be discussed in the following description by way of illustration only.

Figure 1A:
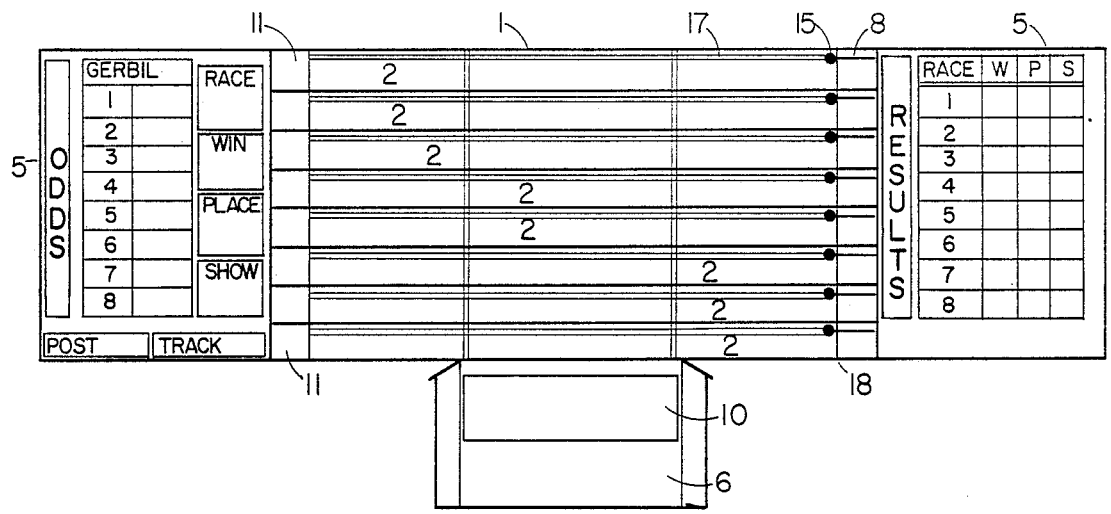
FIG. 1A shows a front view of the track board enclosed by plexiglass and shown with eight racing lanes, the tally boards, and the stable box. Each lane begins with a receptacle (11) for starting box (3).
Figure 2:
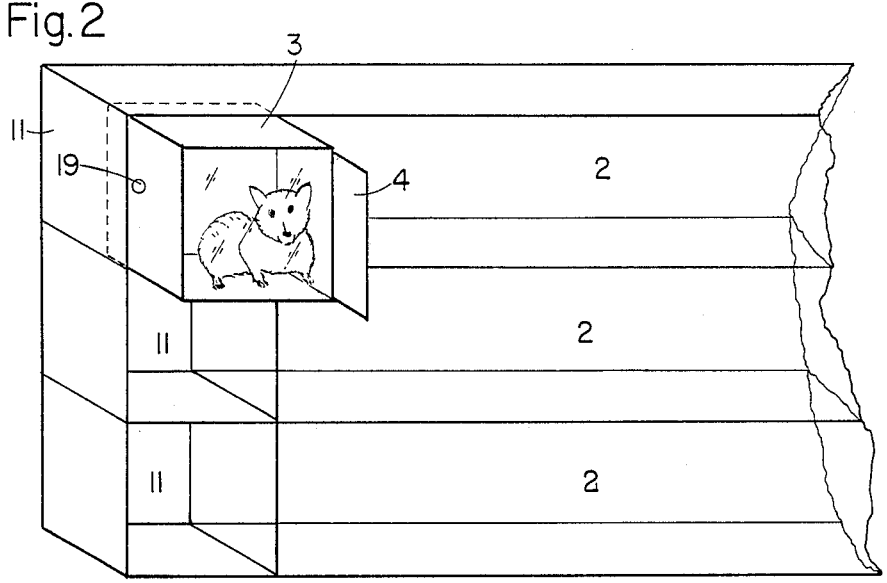
FIG. 2 shows how the starting boxes are placed into the receptacle of the individual racing lanes.

Referring now to FIG. 1A, the stable box (6) is shown supporting the track board (1) with the tally boards (5) attached at both ends. The stable box (6) has at least one stable drawer (10) in which the plural removable starting boxes (3), shown in FIG. 2, are transported to the sets of race (such as a place of public gathering). Prior to entering the establishment where the races will take place, the gerbils are placed (one each) into the starting boxes (3). The starting boxes (3) are then placed within the drawer (10) of the storage box (6). Thus, when the gerbils enter the establishment they are completely confined.

Figure 3:
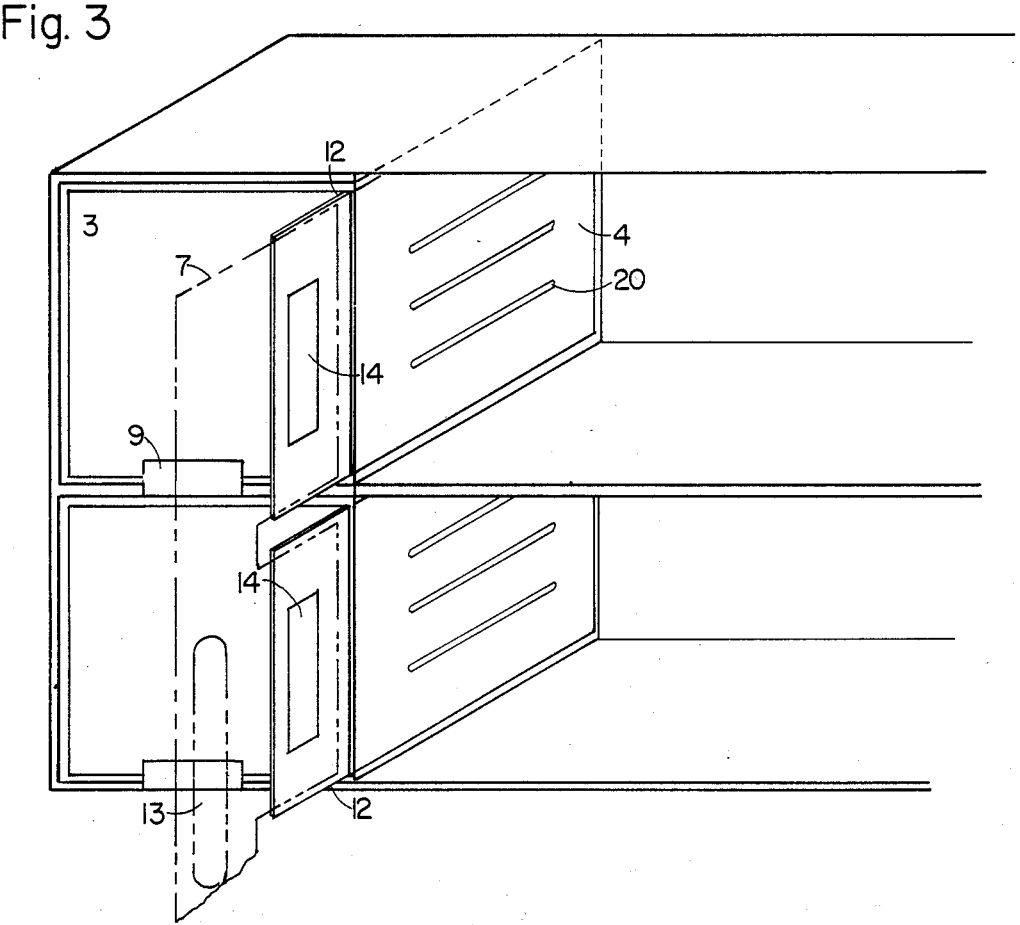
FIG. 3 shows the detail of the starting boxes, including the latch which holds them securely within the racing lanes, and the removable sliding gates with the gate puller attached.

As illustrated in FIG. 2, a starting box (3) is placed in each receptacle (11) of lane in the track board (1). A conventional latch (9) ensures that the starting box (3) does not unintentionally fall from the receptacle (11), particularily when the removal of the sliding starting gate (4) tugs on the box (3). The starting box (3) may be made of any rigid material, such as wood, but it is preferable that the front side be made of a see-through material, such as plexiglass. As shown in FIG. 3, the side of the starting box which forms the removable sliding starting gate (4) has edges (12) which extend from the top and bottom sides to hold the sliding starting gate gate (4). The removable sliding starting gate (4) may be made of any rigid material which will readily slide across the other surfaces of the starting box (3). Metal gates have been found to work well in practice.

FIG. 3 also illustrates the functioning of the gate puller (7). Because a simultaneous start in each lane is critical to a fair race, it is necessary to pull open all of the sliding starting gates (4) at the same moment in time. The gate puller (7) must be removably attached to each sliding gate by attachment means (14). Velcro, which is an adhesive nylon tape, may be attached in areas along the gate puller (7) with corresponding areas attached on each gate (4). Other means, such as hooks, may also be used.

Figure 1B:
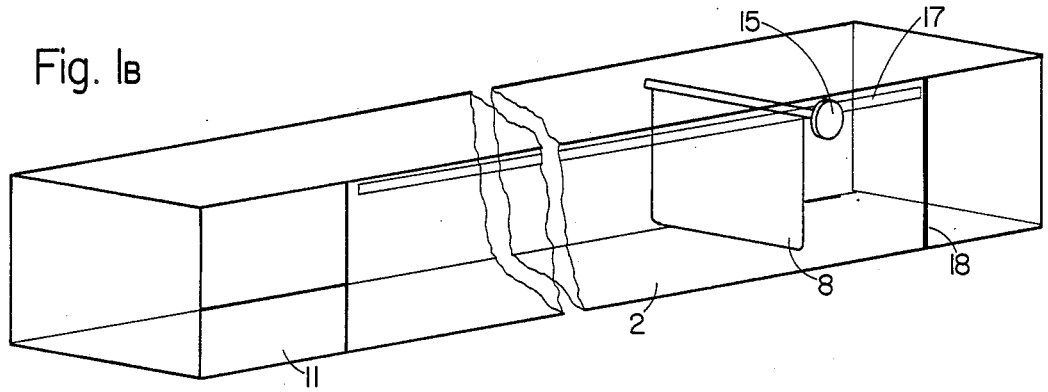
FIG. 1B depicts a single lane.
Figure 1C:
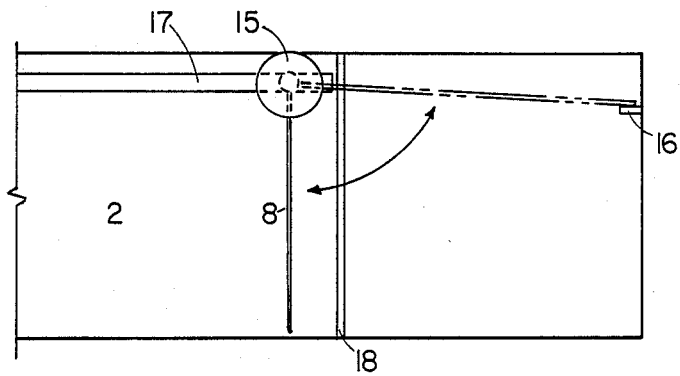
FIG. 1C depicts the control handle and mechanism for moving the chase paddle from the folded up position in lane across the finish line back toward the starting box in its asociated receptible.

Referring back to FIG. 1A, a finish line (18) is drawn on the track board (1) at a distance from the end of each of the plural racing lane (2) approximately the length of one gerbil, allowing him to fully cross the line. After the race, the gerbils, in each of the lanes, are gently urged back into their starting boxes (3) by means of a chase paddle (8) which is stored horizontally in a nonuse position on a ledge (16) at the end of the racing lane (2). Referring to FIG. 1B and FIG. 1C, the chase paddle (8) is removed from the ledge (16) by sliding along slot (17) in the plexiglass at the top front of each racing lane (2). Once removed from the ledge (16), the paddle is suspended vertically from slot (17) by a spendle which attaches to the top of the paddle (8). In each lane (2), a knob (15) is attached to spindle and is used to manipulate the chase paddle (8) through sliding slot (7). A chase paddle (8) is slidably movable by knob (15) along the entire length of each racing lane (2) up to the receptacle (11) of the starting box (3). Once the gerbil has been moved back into the starting box, the sliding gate for that lane and starting box is put back into place. The paddling process is repeated for each racing lane. The starting boxes (3) can now be returned to the storage box (6) to be chosen for the next race as required or for easy transport out of the eating establishment.

Therefore, by use of the inventive method, out-of-cage handling of the gerbils is completely avoided and they remain confined in some manner before, during, and after the races. The starting boxes (3) may have a water bottle hole (19), as shown in FIG. 2, to allow watering while they are enclosed in the starting box (3). The storage box may be made more comfortable for the gerbils by including a heating pad or other heating element for warmth.

Tally boards (5), shown in FIG. 1, keep track of odds, results, track conditions, post time, etc. This is done manually in practice, but could be done electronically as well. The operator hooks mylar cards onto pegs which are attached to the tally boards (5) to show the pertinent information.

Care may be exercised in using the present invention to avoid the promotion of illegal betting on the races and at the same time award winning prizes based on the number of points earned. The prizes greatly increase the entertainment value of the invention. Other methods may be selected in order to utilize the teachings of the present invention in respect to the method and apparatus for the isolation of each small creature, such as a rodents through out the total conduct of racing activity at the situs of the race. No human handling of the small creature is required when the method and/or operation of the present invention are utilized.

Although I have herein shown and described only one preferred embodiment of my invention, it will be apparent to those skilled in the art to which the invention appertains, that various other changes and modifications may be made to the subject invention without departing from the spirit and scope thereof, and therefore it is to be understood that all modifications, variations, and equivalents within the spirit and scope of the subject invention are herein meant to be encompassed in the appended claims.

I claim:

1. Escape-free apparatus for racing rodents or other small creatures, comprising:
   (a) a track board containing more than one enclosed racing lanes positioned in a substantially vertically stacked relationship and each having a see through front for viewing said racing rodents or other small creatures;
   (b) each of said racing lanes having a starting end and a finish line end with no access ports therein except through a drawer port located immediately at the starting end such that access to the drawer port is through the said see through front;
   (c) a removable completely enclosed starting box adopted to contain one of the aforesaid small creatures for each of said racing lanes having a sliding gate for positioning within the drawer port for the assigned enclosed lane with said sliding gate being movable sideways away from the see through front so as to open the previously completely enclosed stating box giving the small creature access to the assigned lane so as to start the race for that creature;
   (d) means for simultaneously opening all of each of said sliding gates in all of said racing lanes;
   (e) means in each of said lanes for returning said racing creatures to said starting boxes.
   (f) said apparatus cooperating so that the said small creature in each lane never leave the enclosed space formed by either one of the said removable starting boxes of the said lane enclosure with which it is associated.

2. (a) said means for simultaneously opening all of said sliding gates is a gate puller having means for attaching to said sliding gates;
   (b) said means for returning the racing creatures to said starting boxes is a paddle means slidably attached to and vertically suspended inside each of said racing lanes and manually slidable along the length of each of said racing lanes manually moving a handle through a narrow longitudinal slot in the said see through front of each of said racing lanes.

3. The apparatus of claim 1, further comprising:
   (a) tally boards to show the results of the races and to give the odds of the next race;
   (b) said means for returning the racing creatures to said starting boxes is a paddle means slidably attached to and vertically suspended inside each of said racing lanes.

4. An escape-free method of racing rodents or other small animals to avoid a health hazard within a plural lane track board having completely enclosed plural lanes on top of one another and having a see through side for viewing by the audience and a removable completely enclosed starting box adopted to contain one of the aforesaid small creatures for each of said racing lanes having a sliding gate for positioning within the assigned enclosed lane with said sliding gate being movable sideways away from the see through front so as to open the previously completely enclosed starting box giving the small creature access to the assigned lane so as to start the race for the creature comprising;
   (a) placing the creatures to be raced in the said enclosed starting boxes prior to entering an establishment where the races are to occur;
   (b) attaching said enclosed starting boxes to a receptacle formed into the see through side in each otherwise fully enclosed racing lane contained in said track board;
   (c) simultaneously releasing each of the creatures to be raced from the side of the enclosed starting box facing the audience within its own lane on said track board;
   (d) returning the creatures to their starting boxes by internal means controlled manually through the see through side of each of said racing lanes; and
   (e) thereby confining the creatures at all times.

* * * * *